W. J. SULLIVAN.
APPARATUS FOR TRANSPORTING AND UNLOADING BRICK.
APPLICATION FILED DEC. 15, 1920.
1,432,638. Patented Oct. 17, 1922.
3 SHEETS—SHEET 1.
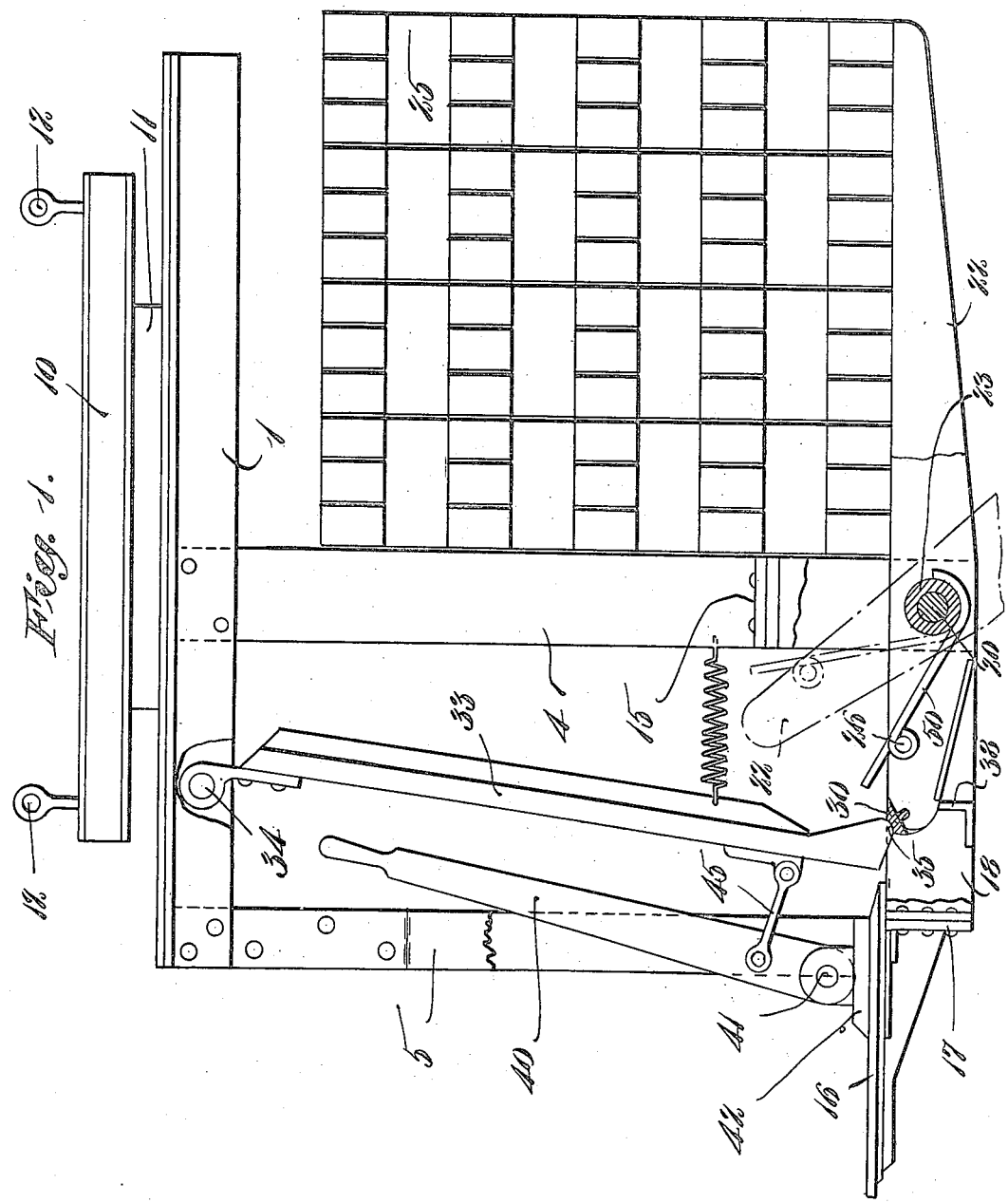

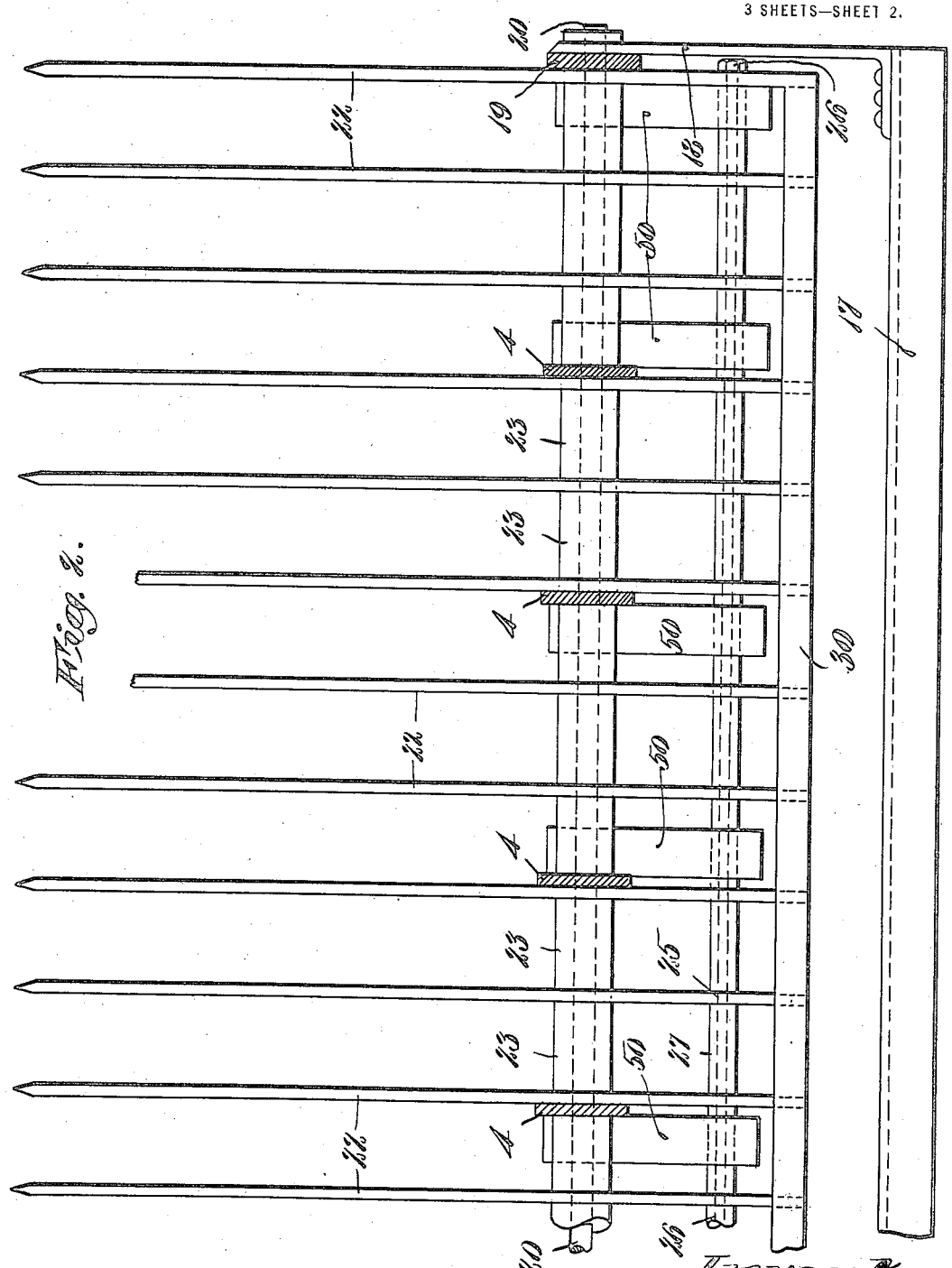

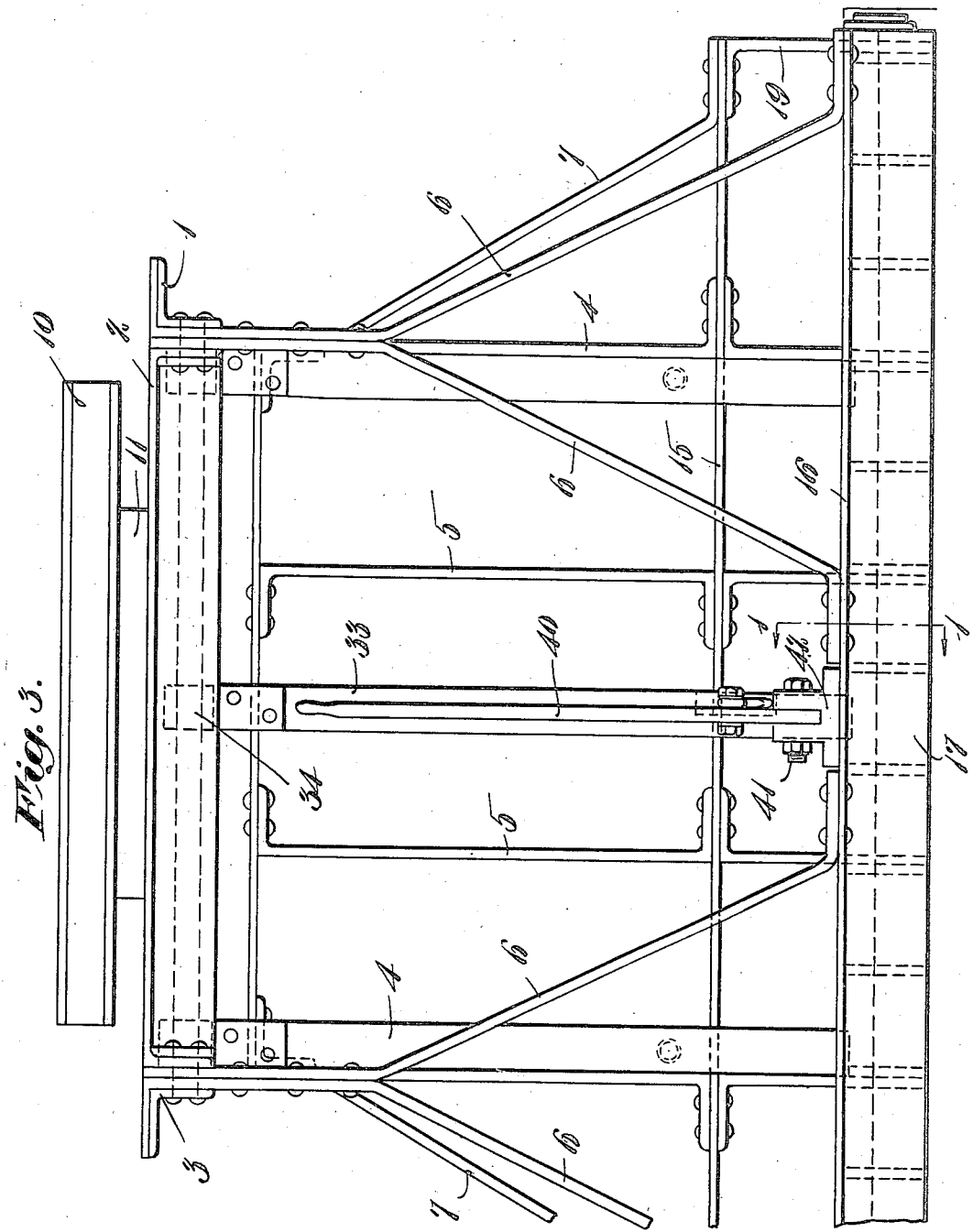

Patented Oct. 17, 1922.

1,432,638

UNITED STATES PATENT OFFICE.

WILLIAM J. SULLIVAN, OF CHICAGO, ILLINOIS, ASSIGNOR TO AMERICAN EQUIPMENT COMPANY, OF CHICAGO, ILLINOIS, A CORPORATION OF OHIO.

APPARATUS FOR TRANSPORTING AND UNLOADING BRICK.

Application filed December 15, 1920. Serial No. 430,827.

*To all whom it may concern:*

Be it known that I, WILLIAM J. SULLIVAN, a citizen of the United States, and resident of Chicago, in the county of Cook and State of Illinois, have invented an Improvement in Apparatus for Transporting and Unloading Brick, of which the following description, in connection with the accompanying drawings, is a specification, like characters on the drawings representing like parts.

In the art of handling brick by mechanical means, setting machines, and the like, wherein a unit or stack of brick is handled, numerous devices have heretofore been made for lifting, conveying and releasing such unit stacks of brick. In my present invention I have produced a mechanical brick handling apparatus intended to facilitate the unloading or discharging of the unit stack of brick either while maintaining the unit in its stacked and piled relation, or to discharge the same quickly by dumping the entire unit and destroying the unit formation. In the prior mechanical unit handling apparatus, the brick engaging members or fingers which extended underneath the unit or stack of brick, were arranged substantially rigid with the rest of the apparatus, so far as the maintenance of a right angled construction was concerned. This was considered necessary in order to give the desired strength, balanced construction and horizontal lifting and carrying features to such brick handling apparatus. Where it was desired to quickly unload such a unit from the lifting apparatus, it has heretofore been necessary, if possible, to incline or tilt the entire apparatus in order to quickly discharge or unload the brick as by dumping the same into a truck, car, platform or the like, for further transportation after the unit formation was no longer desired to be maintained and speed in unloading was the important factor. Such a tilting operation was difficult, required considerable time to manipulate the raising and lowering devices, and was unsatisfactory in operation.

My present invention is directed to obviate the difficulties heretofore experienced and to complete and perfect a brick handling apparatus, which can be utilized to lift, transport and set down a unit stack of brick, while maintaining the same in its unit formation and with the brick as originally piled and spaced, or which can be utilized to instantly dump the entire unit, thus quickly discharging the load when it is no longer desired to maintain the same in stacked relation. In carrying out the present invention I provide a brick lifting apparatus with means permitting the plurality of fingers which are used to carry the load, to be pivotally mounted and to be released, thus inclining and tilting the fingers and consequently inclining the brick holding means, without inclining, tilting or manipulating the brick setting or carrying apparatus nor the supporting means therefor. I believe that the combination of such devices in the art of mechanically handling units of brick is distinctly new and I wish to claim the same herein broadly.

Referring to the drawings illustrating a preferred embodiment of the invention,

Fig. 1 is a side view showing the apparatus with a unit load of brick thereon, maintained in its horizontal, vertical and unit stack formation.

Fig. 2 is a plan view of the fingers; and

Fig. 3 is a side view;

It will be appreciated that I may embody the invention in a brick handling apparatus of any suitable size or capacity, and may also employ wellknown types of brick-setting lifters and carriers, such for example as the devices of R. C. Penfield Patents, Nos. 1,150,061 and 1,205,562, dated Aug. 17, 1915 and Nov. 21, 1916 respectively, embodying my invention in machines of that type, if desired. In the attached drawings, I have illustrated the invention in simple form, wherein a carrier comprises a framework, preferably of channel or angle iron construction, including top bars 1, 2, 3, vertical frames 4, 4 and 5, 5, together with bracing members 6, 6, 6, 6, and 7, 7, securely bolted or riveted together, substantially as illustrated, to give a strong light framework which is preferably supported from an overhead framework 10 by means of an intermediate turntable 11 of any suitable, wellknown construction, which top frame is supported at a plurality of points 12, 12, (four in number usually being employed) at spaced positions to afford the desired center of gravity for the entire apparatus, whether loaded or unloaded. Bottom frames 15 and 16 at the rear of the machine and cross braces 17 are fitted together with brackets 18, giving a rigid leverage from the vertical frames 4 to the rearward vertical frames 5. The side braces 6 and 7 give a further vertical bracket member 19 at each end of the setter, the cross brackets 18 extending thereto from the rear cross brace 17 and thus giving a plurality of strongly braced points throughout the framework at 19, and 4, 4, for bearings for a shaft 20. This shaft 20 constitutes the pivotal supporting means and mounting for a plurality of brick engaging fingers 22, said fingers being pivoted directly upon the shaft 20 and held in spaced relation by a plurality of sleeves 23, 23, 23 (see Fig. 2). All of these brick engaging fingers 22 extend forwardly from the shaft 20 a sufficient distance to carry the courses or tiers of brick constituting the unit stack 25 as may be desired, and extend rearwardly between the vertical frames 4 and rear frames 5, where they are united by a bolt 26 passing therethrough and with sleeves 27 also spacing the said fingers similar to the sleeves 23 on the shaft 20. These fingers are further secured together by a cross member 30 at their extreme rearmost portions. Bearing on the cross member 30 is a locking bar 33 pivoted at 34 to the upper part of the framework and with a heel as shown at 35, adapted to rest in a corresponding recess in the crossbar 30 substantially central of the machine. The member 33 is a locking bar or compression member adapted to hold the fingers 22 in horizontal position and with the rearmost part resting upon a stop 38 formed as an angle iron and secured between a pair of cross brackets 18. With the locking bar 33 in engagement with the cross member 30, the apparatus if fitted to lift, carry and set down the unit stack 25 while maintained in its stacked relation and suitable for all the uses and purposes for which the present types of unit brick carrying forks are employed. In order to release the unit load quickly, as when dumping into a wagon, truck, car, or the like, I provide a handle 40, pivoted at 41 to a block 42 at the rear of the machine and with a link 45 from said handle lever 40 to the lower part of the locking bar 33 and consequently a pull on the handle will displace the locking arm 33 from its engagement with the member 30 and thereby release the entire series of brick carrying fingers 22, permitting them to rock upon the shaft 20 and dump the load.

In order to prevent too rapid a descent of the fingers 22, I provide a plurality of leaf springs 50, 50, 50 bearing between the bolt 26 and the shaft 20, or the sleeves 23 around the same. These leaf springs may be of desired tension and number to break the rapid descent of the fingers 22, and to automatically return the fingers 22 into horizontal position after the load of brick 25 is discharged. I have illustrated in dotted lines the position of the fingers 22 when thus permitted to assume an inclined or angular position for the sliding off of the load 25. With the fingers 22 replaced into horizontal position and bearing on the stop 38, the handle 40 is then moved to replace the locking bar 33 into engagement with the cross member 30, and thus holding the entire set of fingers into brick lifting and carrying position.

My invention is further described and defined in the form of claims as follows:

1. Brick handling apparatus of the kind described, comprising a framework adapted to be suspended in balanced relation from an overhead support, a plurality of brick engaging fingers normally extending horizontally and adapted to be the lifting, supporting and carrying devices for handling a plurality of brick in stacked relation, together with means permitting an inclination of said brick engaging devices at any time to afford a gravity discharge of the brick, in combination with means acting on said devices to effect a gradual inclination.

2. Brick lifting apparatus consisting in a combined rigid brick carrier adapted to lift, hold, maintain and transport a plurality of brick in stacked relation, together with means actuated by the operator to incline the brick holding members of the apparatus to effect a gravity discharge of the brick and means to automatically return the brick-engaging devices into normal horizontal position.

3. Brick handling apparatus of the kind described, consisting in a rigid framework and a pivoted brick carrying portion adapted to be held in horizontal relation to the apparatus or to be inclined therewith, in combination with means to lock said brick carrying portion in its horizontal position, having yielding means to afford a gradual inclination of the brick lifting portion and yielding means automatically effecting a return of the brick lifting portion from inclined to horizontal position.

In testimony whereof, I have signed my name to this specification.

WILLIAM J. SULLIVAN.